US008605961B2

(12) United States Patent
Schuler et al.

(10) Patent No.: US 8,605,961 B2
(45) Date of Patent: Dec. 10, 2013

(54) METHOD AND APPARATUS FOR DETERMINING A PHYSIOLOGICAL PARAMETER USING A FINGERPRINT SENSOR ON A PORTABLE ELECTRONIC DEVICE

(75) Inventors: Francesca Schuler, Des Plaines, IL (US); Mohamed I. Ahmed, Glendale Heights, IL (US); Krishna Jonnalagadda, Mason, OH (US)

(73) Assignee: Motorola Mobility LLC, Libertyville, IL (US)

( * ) Notice: Subject to any disclaimer, the term of this patent is extended or adjusted under 35 U.S.C. 154(b) by 934 days.

(21) Appl. No.: 12/413,942

(22) Filed: Mar. 30, 2009

(65) Prior Publication Data

US 2010/0245553 A1 Sep. 30, 2010

(51) Int. Cl.
*G06K 9/00* (2006.01)
(52) U.S. Cl.
USPC .......................................... 382/124; 382/128
(58) Field of Classification Search
USPC .................................. 382/124, 128
See application file for complete search history.

(56) References Cited

U.S. PATENT DOCUMENTS

| | | | |
|---|---|---|---|
| 5,148,809 A | 9/1992 | Biegeleisen-Knight | |
| 5,719,950 A * | 2/1998 | Osten et al. | 382/115 |
| 6,176,832 B1 | 1/2001 | Habu et al. | |
| 6,292,576 B1 * | 9/2001 | Brownlee | 382/124 |
| 6,483,929 B1 * | 11/2002 | Murakami et al. | 382/115 |
| 6,616,613 B1 | 9/2003 | Goodman | |
| 7,018,338 B2 | 3/2006 | Vetter et al. | |
| 7,254,255 B2 * | 8/2007 | Dennis | 382/115 |
| 7,336,982 B2 | 2/2008 | Yoo | |
| 7,590,269 B2 * | 9/2009 | Creasey et al. | 382/124 |
| 8,229,185 B2 * | 7/2012 | Ennis et al. | 382/124 |
| 2003/0233051 A1 * | 12/2003 | Verjus et al. | 600/528 |
| 2004/0208348 A1 * | 10/2004 | Baharav et al. | 382/124 |
| 2005/0089202 A1 | 4/2005 | Setlak et al. | |
| 2006/0009700 A1 | 1/2006 | Brumfield et al. | |
| 2006/0015021 A1 * | 1/2006 | Cheng | 600/310 |
| 2006/0067887 A1 | 3/2006 | Guittet et al. | |
| 2006/0115134 A1 * | 6/2006 | Kozlay | 382/128 |
| 2006/0211930 A1 | 9/2006 | Schaf et al. | |

(Continued)

FOREIGN PATENT DOCUMENTS

DE 102007017713 A1 10/2008
EP 1353292 A1 10/2003

(Continued)

OTHER PUBLICATIONS

Imtiaz Ahmed; U.S. Appl. No. 12/347,400, filed Dec. 31, 2008.

(Continued)

*Primary Examiner* — John Strege

(57) ABSTRACT

A method (300) and apparatus (200) that determines a physiological parameter using a fingerprint sensor on a portable electronic device is disclosed. The method can include capturing (320) a plurality of images corresponding to an area beneath a surface of skin using a fingerprint sensor configured to capture a live scan of a fingerprint pattern from a finger on a touch surface on a portable electronic device. The method can include comparing (330) image characteristics corresponding to at least a first image of the plurality of images with image characteristics corresponding to at least a second image of the plurality of images. The method can include determining (340) a physiological parameter based on comparing the image characteristics.

19 Claims, 6 Drawing Sheets

(56) References Cited

U.S. PATENT DOCUMENTS

| | | | |
|---|---|---|---|
| 2007/0032725 | A1 | 2/2007 | Watanabe et al. |
| 2007/0106183 | A1 | 5/2007 | Suzuki et al. |
| 2007/0160283 | A1 | 7/2007 | Saphier et al. |
| 2007/0219439 | A1* | 9/2007 | Vilser et al. ............... 600/323 |
| 2008/0021331 | A1* | 1/2008 | Grinvald et al. ............ 600/476 |
| 2008/0132798 | A1 | 6/2008 | Hong et al. |
| 2008/0273768 | A1* | 11/2008 | Dennis et al. ............... 382/124 |
| 2009/0203998 | A1 | 8/2009 | Klinghult et al. |
| 2009/0226071 | A1 | 9/2009 | Schuler et al. |
| 2009/0281435 | A1 | 11/2009 | Ahmed et al. |
| 2010/0166252 | A1 | 7/2010 | Ahmed et al. |
| 2012/0078066 | A1 | 3/2012 | Ahmed et al. |
| 2012/0078119 | A1 | 3/2012 | Ahmed et al. |
| 2012/0078120 | A1 | 3/2012 | Ahmed et al. |
| 2012/0078130 | A1 | 3/2012 | Ahmed et al. |

FOREIGN PATENT DOCUMENTS

| | | |
|---|---|---|
| EP | 1988489 A1 | 11/2008 |
| WO | 01/24700 A1 | 4/2001 |
| WO | 02/09049 A1 | 1/2002 |

OTHER PUBLICATIONS

Francesca Schuler; U.S. Appl. No. 12/043,515, filed Mar. 6, 2008.
http://en.wikipedia.org/wiki/VO2.
http://en.wikipedia.org/wiki/Fingerprint_reader.
http://www.amazon.com/Mark-Fitness-MF-180-Exercise-Monitor/dp/B0002VG510.
http://www.amazon.com/Insta-Pulse-105-MonitorInstapulse/dp/B000FJ02PO/ref=sr.
http://www.cosycommunications.com/Digitalpulsemonitorcatalogue.htm.
http://www.amazon.com/Reebok-Fitwatch-StraplessHeartMonitor/dp/B000G37H0M/ref=sr_1_1?ie=UTF8&s=hpc&qid=1238427454&sr=1-1.
International Search Report Issued Jul. 16, 2010, in connection with related PCT Application No. PCT/US2010/026943.
D. Maltoni et al; "Handbook of Fingerprint Recognition, Passage" Jan. 1, 2003; Handbook of Fingerprint Recognition; [Springer Professional Computing], Springer Verlag, New York, US, pp. 281-292.
Davide Maltoni et al.; "Handbook of Fingerprint Recognition" 2003; Springer Professional Computing; XP002590073; pp. 26-29.
Jia Zheng, et al, "Remote Simultaneous Dual Wavelength Imagining Photoplethysmography: A Further Step Towards 3-D Mapping of Skin Blood Microcirculation", XP-002526642, 2008, 8 pages, United Kingdom.
K. Nakajima, et al, "Monitoring of Heart and Respiratory Rates by Photoplethysmography Using a Digital Filtering Technique", XP-002446273, Jul. 1996, vol. 18, pp. 365-372, Great Britian.
Rolando Hong Enriquez, et al, "Analysis of the Photoplethysmographic Signal by Means of the Decomposition in Principal Components", Jun. 14, 2002, 14 pages, United Kingdom.
Chihiro Takano and Yuji Ohta, "Heart Rate Measurement Based on a Time-Lapse Image", Sep. 19, 2006, 5 pages.
F.P. Wieringa, et al., "Contactless Multiple Wavelength Photoplethysmographic Imaging: A First Step Toward SpO2 Camara Technology", Aug. 2005, vol. 22, No. 8, 8 pages.
Wim Verkruysse, et al., "Remote Plethysmographic Imagining Using Ambient Light", Optic Society of America, Dec. 22, 2008, vol. 16, No. 26, Norway.
European Patent Office, "Communication", for European Pat. Appln. No. 09718414.7, Aug. 3, 2011, 9 pages.
Patent Cooperation Treaty, "PCT Search Report and Written Opinion of the International Searching Authority" for International Application No. PCT/US2009/035836, Aug. 24, 2009, 10 pages.
United States Patent and Trademark Office, "Non-Final Rejection", for U.S. Appl. No. 12/043,515 dated Aug. 17, 2011, 8 pages.

* cited by examiner

METHOD AND APPARATUS FOR DETERMINING A PHYSIOLOGICAL PARAMETER USING A FINGERPRINT SENSOR ON A PORTABLE ELECTRONIC DEVICE

CROSS-REFERENCE TO RELATED APPLICATIONS

This application is related to application Ser. No. 12/347,400 entitled "Method and Apparatus for Determining Blood Oxygenation Using a Mobile Communication Device," filed on Dec. 31, 2008, and commonly assigned to the assignee of the present application, which is hereby incorporated by reference.

BACKGROUND

1. Field

The present disclosure is directed to a method and apparatus for determining a physiological parameter using a fingerprint sensor on portable electronic device. More particularly, the present disclosure is directed to determining a physiological parameter, such as a heart rate and/or oxygen consumption, from images captured using a fingerprint sensor on a portable electronic device.

2. Introduction

Presently, mobile communication device users can engage in active lifestyle activities and may desire to obtain corresponding physiological parameters, such as heath metrics, blood related physiological parameters, heart rate, oxygen consumption, maximal oxygen consumption ($VO_2$ max), blood oxygenation, or any other physiological parameters. The ability to easily obtain key health metrics provides users with the ability to monitor their health and fitness. Tracking and monitoring data like distance, speed, caloric burn, heart rate, and other key measurements can help users achieve their health and fitness goals. For example, heart rate monitors can be used to measure the heart rate of users with active lifestyles. Heart rate monitors are also useful for patients with respiratory or cardiac issues and useful for athletes whose heart rate may change at high altitudes and/or with intense exercise.

Unfortunately, most heart rate monitors require the use of specialized equipment and are not easy to integrate into existing portable electronic devices because such integration requires extensive hardware modifications to the devices. Also, heart rate monitors do not always meet all end user requirements in all application settings. At the very least, such devices require a user to maintain, keep powered, and carry about an additional device along with their other portable devices, such along with their cellular phone. This can lead to unwanted surprises when the additional device has run out of power during a time of need and/or when a user does not have the additional device during a time of need because the user has not included the device amongst the items that the user carries about.

Thus, there is a need for method and apparatus that determines a physiological parameter using a fingerprint sensor on a portable electronic device.

SUMMARY

A method and apparatus that determines a physiological parameter using a fingerprint sensor on a portable electronic device is disclosed. The method can include capturing a plurality of images corresponding to an area beneath a surface of skin using a fingerprint sensor configured to capture a live scan of a fingerprint pattern from a finger on a touch surface on a portable electronic device. The method can include comparing image characteristics corresponding to at least a first image of the plurality of images with image characteristics corresponding to at least a second image of the plurality of images. The method can include determining a physiological parameter based on comparing the image characteristics.

BRIEF DESCRIPTION OF THE DRAWINGS

In order to describe the manner in which advantages and features of the disclosure can be obtained, a more particular description of the disclosure briefly described above will be rendered by reference to specific embodiments thereof which are illustrated in the appended drawings. Understanding that these drawings depict only exemplary embodiments of the disclosure and are not therefore to be considered to be limiting of its scope, the disclosure will be described and explained with additional specificity and detail through the use of the accompanying drawings in which.

DETAILED DESCRIPTION

Figure 1:
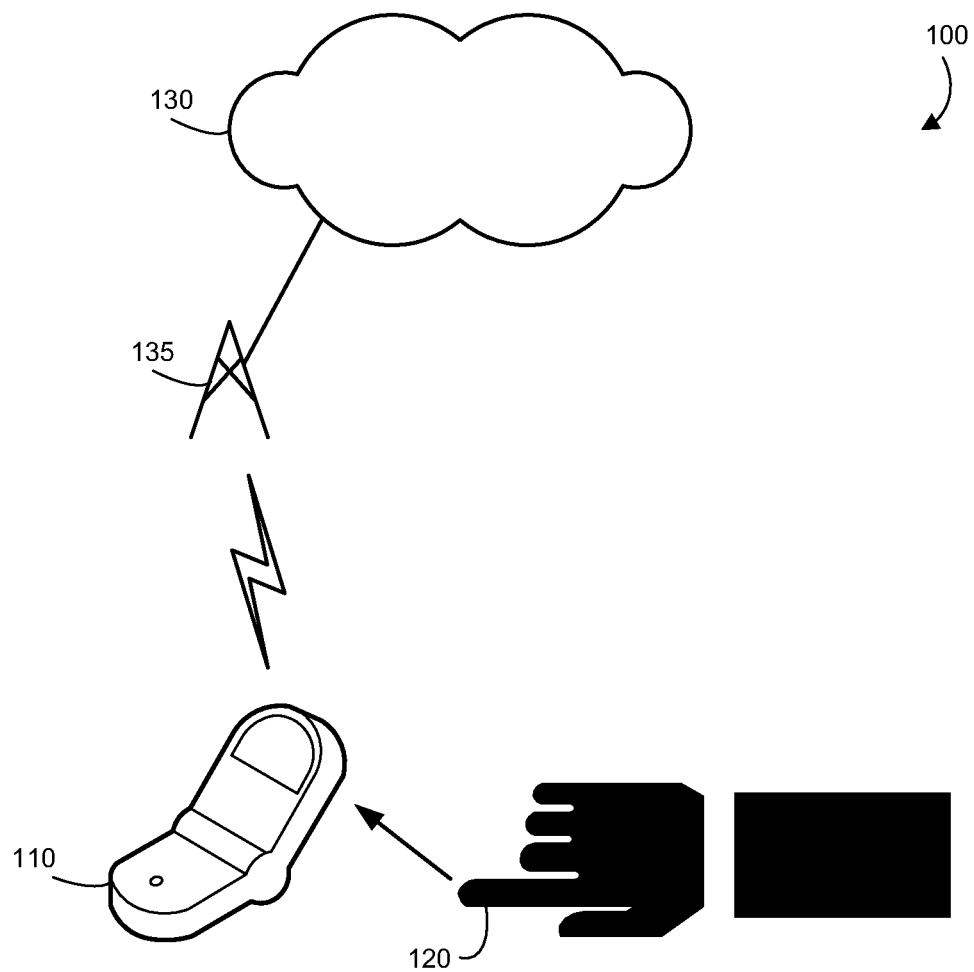
FIG. 1 illustrates an exemplary diagram of a system in accordance with a possible embodiment.

FIG. 1 is an exemplary block diagram of a system 100 according to a possible embodiment. The system 100 can include a network 130, a terminal 110, and a base station 135. The terminal 110 may be a portable electronic device, such as a mobile communication device like a selective call receiver. For example, a selective call receiver can be mobile phone, a cellular phone, a personal digital assistant, a pager, or any other device that can engage in selective call receiver communications over a long distance wireless network, such as the network 130. The base station 135 may be a cellular base station, a wireless local area network access point, or any other device that provides wireless access between a wireless device and a network. The network 130 may include any type of network that is capable of sending and receiving signals, such as wireless signals. For example, the network 130 may include a wireless telecommunications network, a cellular telephone network, a Time Division Multiple Access (TDMA) network, a Code Division Multiple Access (CDMA) network, a satellite communications network, and other like communications systems. Furthermore, the network 130 may include more than one network and may include a plurality of different types of networks. Thus, the network 130 may include a plurality of data networks, a plurality of telecommunications networks, a combination of data and telecommunications networks and other like communication systems capable of sending and receiving communication signals.

In operation, a fingerprint sensor on the terminal 110 can operate in a fingerprint reader mode that can include capturing a live scan of a fingerprint pattern from a finger 120 on a touch surface to authenticate a user of the terminal 110. In accordance with some embodiments, fingerprint sensor parameters can be changed to switch the fingerprint sensor from the fingerprint reader mode to a heart rate determination mode. A plurality of images corresponding to an area beneath a surface of skin can then be captured using the fingerprint sensor. Image characteristics corresponding to at least a first image of the plurality of images can be compared with image characteristics corresponding to at least a second image of the plurality of images. A physiological parameter, such as a blood related physiological parameter like heart rate, oxygen consumption, maximal oxygen consumption ($VO_2$ max), blood oxygenation, or any other physiological parameter, can be determined based on comparing the image characteristics. Data corresponding to the physiological parameter can be output from a module in the terminal 110. For example, the data corresponding to a heart rate can be output to memory on the terminal 110, can be output on a display, can be output using an auditory signal, can be output by wirelessly transmitting the data, or can be output in any other manner.

As a further example, a physiological parameter of a subject can be determined using a fingerprint sensor available on a mobile device, such as on the terminal 110. A user can place his/her finger in proximity to the fingerprint sensor and a video or picture sequence can be captured. Image analysis and signal processing techniques can then be used on the captured sequence to process and extract a physiological parameter. The processing can be done either in real-time, such as while the picture sequence is being captured, or can be done off-line after the picture sequence has been captured. An existing fingerprint reader on the terminal 110 can be used for a physiological parameter measurement and the process can be implemented in the terminal 110 without hardware changes. This aspect can be implemented for users involved in fitness activities, for those with special health care needs, for heath care practitioners, and for other users interested in determining a physiological parameter.

As yet a further example, a physiological parameter determination application can be launched in the terminal 110. The physiological parameter determination application can enable a physiological parameter determination mode on the terminal 110. For example, the physiological parameter determination application can switch a fingerprint sensor, such as a fingerprint scanner, from a fingerprint swipe mode to a physiological parameter determination mode that can constantly sense or scan a user's finger that is placed against the fingerprint sensor over a set period of time. A user can then place their finger in front of a fingerprint sensor on the terminal 110. The physiological parameter determination application can then determine the user's physiological parameter and can display the corresponding information on a display of the terminal 110. For example, the physiological parameter determination application can determine the physiological parameter by performing intensity and color based image analysis of the scanned finger. The physiological parameter determination application can display the corresponding data, time stamp the corresponding data, and/or store the corresponding data on the terminal 110 or at a server coupled to the network 130. The physiological parameter determination application can also use the physiological parameter data as an additional form of identification of a user.

Figure 2:
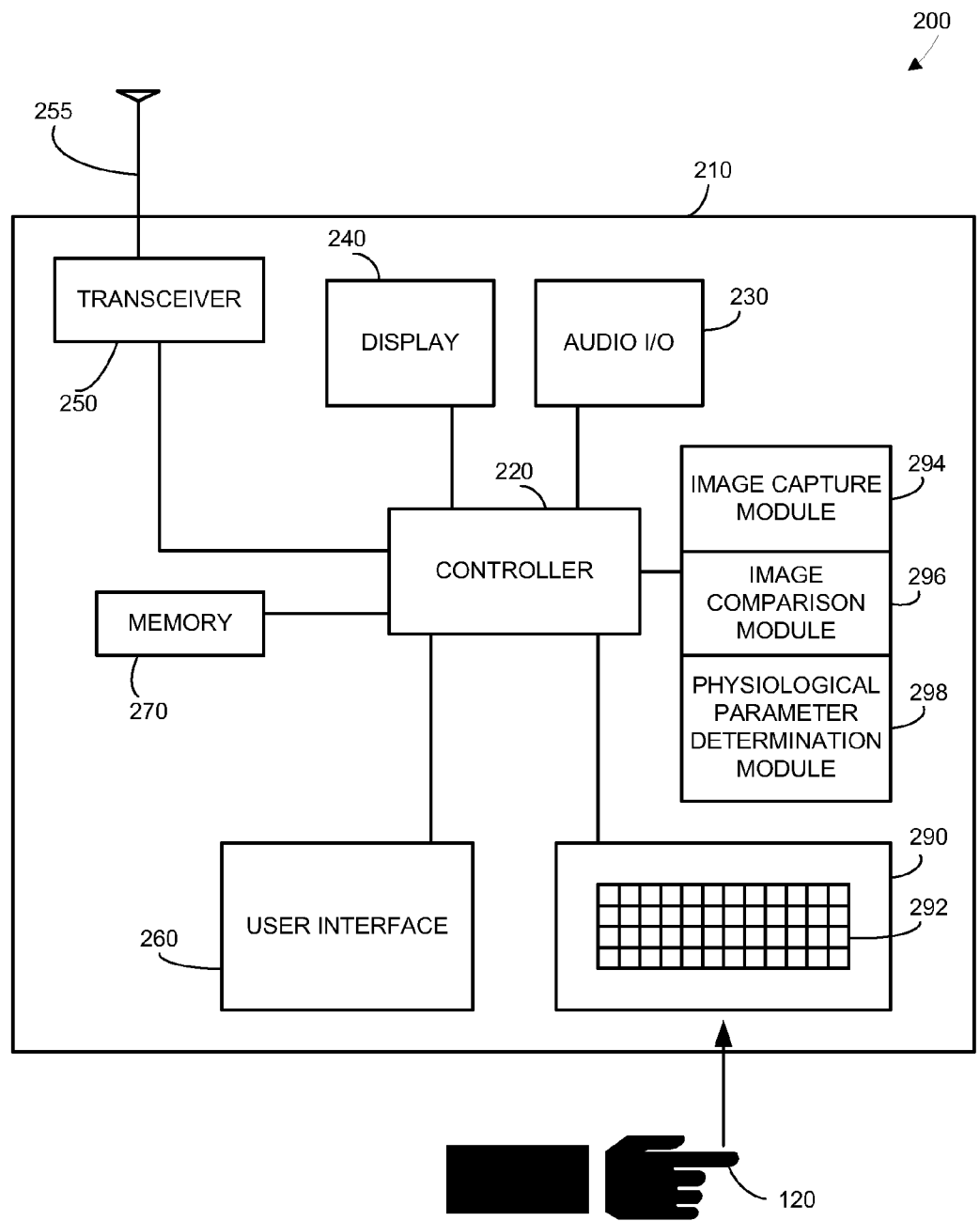
FIG. 2 illustrates an exemplary block diagram of an apparatus in accordance with a possible embodiment.

FIG. 2 is an exemplary block diagram of an apparatus 200, such as the terminal 110, according to a possible embodiment. The apparatus 200 can include a portable electronic device housing 210, a controller 220 coupled to the housing 210, audio input and output circuitry 230 coupled to the housing 210, a display 240 coupled to the housing 210, a selective call receiver transceiver 250 coupled to the housing 210, an antenna 255 coupled to the transceiver 250, a user interface 260 coupled to the housing 210, and a memory 270 coupled to the housing 210. The apparatus 200 can also include a fingerprint sensor 290 coupled to the housing 210 and coupled to the controller 220. The fingerprint sensor 290 can include an array of pixels 292. The fingerprint sensor 290 can be a complementary metal-oxide-semiconductor active pixel sensor digital imager or any other fingerprint sensor that can be coupled to a portable electronic device. The apparatus 200 can also include an image capture module 294, an image comparison module 296, and a physiological parameter determination module 298. The image capture module 294, the image comparison module 296, and/or the physiological parameter determination module 298 can be coupled to the controller 220, can reside within the controller 220, can reside within the memory 270, can be autonomous modules, can be software, can be hardware, or can be in any other format useful for a module on a apparatus 200.

The display 240 can be a liquid crystal display (LCD), a light emitting diode (LED) display, a plasma display, or any other means for displaying information. The transceiver 250 can include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory, a subscriber identity module memory, or any other memory that can be coupled to a wireless communication device.

In operation, the controller 220 can be configured to control operations of the apparatus 200. The selective call receiver transceiver 250 can be configured to engage in selective call receiver communications over a long distance wireless wide area network, such as the network 130, and can wirelessly transmit and receive data across the wireless wide area network. The fingerprint sensor 290 can be configured to capture a live scan of a fingerprint pattern from a finger 120 on a touch surface. The image capture module 294 can be configured to capture a plurality of images using the fingerprint sensor 290. The plurality of images can correspond to an area beneath a surface of skin. The image comparison module 296 can be configured to compare image characteristics corresponding to at least a first image of the plurality of images with image characteristics corresponding to at least a second image of the plurality of images. The physiological parameter determination module 298 can be configured to determine a physiological parameter based on comparing the image characteristics. The physiological parameter can be a blood related physiological parameter, such as heart rate, oxygen consumption, maximal oxygen consumption, blood oxygenation, or can be any other physiological parameter.

The controller 220 can be configured to operate the fingerprint sensor 290 in a fingerprint reader mode that can include capturing a live scan of a fingerprint pattern from a finger on the touch surface to authenticate a user of the apparatus 200. The controller 220 can be configured to change fingerprint sensor parameters to switch the fingerprint sensor 290 from the fingerprint reader mode to a physiological parameter determination mode.

Figure 3:
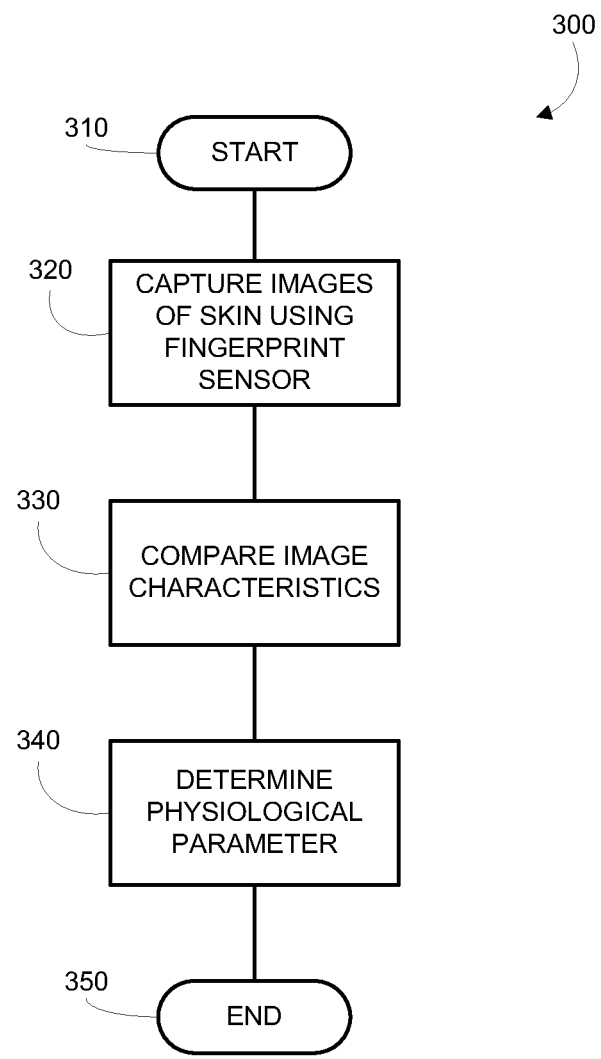
FIG. 3 is an exemplary flowchart illustrating the operation of an apparatus in accordance with a possible embodiment.
Figure 5:
FIG. 5 is an illustrative example of a visible light image in accordance with a possible embodiment.

FIG. 3 is an exemplary flowchart 300 illustrating the operation of an apparatus, such as the apparatus 200, according to a possible embodiment. At 310, the flowchart begins. At 320, a plurality of images corresponding to an area beneath a surface of skin can be captured using a fingerprint sensor configured to capture a live scan of a fingerprint pattern from a finger on a touch surface on a portable electronic device. The portable electronic device can be a wireless wide area network communication device, a personal digital assistant, a laptop computer, a handheld portable electronic device, a handheld cellular communication device, a cellular phone, or other portable electronic device. For example, a wireless wide area network communication device can be a cellular communication device that can communicate with cellular base stations. The fingerprint sensor can be integrated into the portable electronic device and can include an array of pixels. The fingerprint sensor can capture a live scan of a finger pressed or swiped against the fingerprint sensor. The plurality of images corresponding to an area beneath a surface of skin can be captured using an array of pixels in a fingerprint sensor. Pixels can be sensor elements, sensels, pixel sensors, or any other pixels that can be used in a fingerprint sensor. FIG. 5 illustrates an example of a visible light image 501 that can be captured using a fingerprint sensor on a portable electronic device.

At 330, image characteristics corresponding to at least a first image of the plurality of images can be compared with image characteristics corresponding to at least a second image of the plurality of images. Image characteristics can be compared by comparing differences between image characteristics corresponding to at least the first image of the plurality of images and image characteristics corresponding to at least the second image of the plurality of images. Image characteristics can be compared by comparing image characteristics corresponding to a first intensity of at least the first image with image characteristics corresponding to a second intensity of at least the second image, where a difference between the first intensity and the second intensity can correspond to changes in density of blood flow.

At 340, a physiological parameter can be determined based on comparing the image characteristics. The physiological parameter can be a blood related physiological parameter, such as heart rate, oxygen consumption, maximal oxygen consumption, blood oxygenation, or can be any other physiological parameter. At 350, the flowchart 300 can end.

Figure 4:
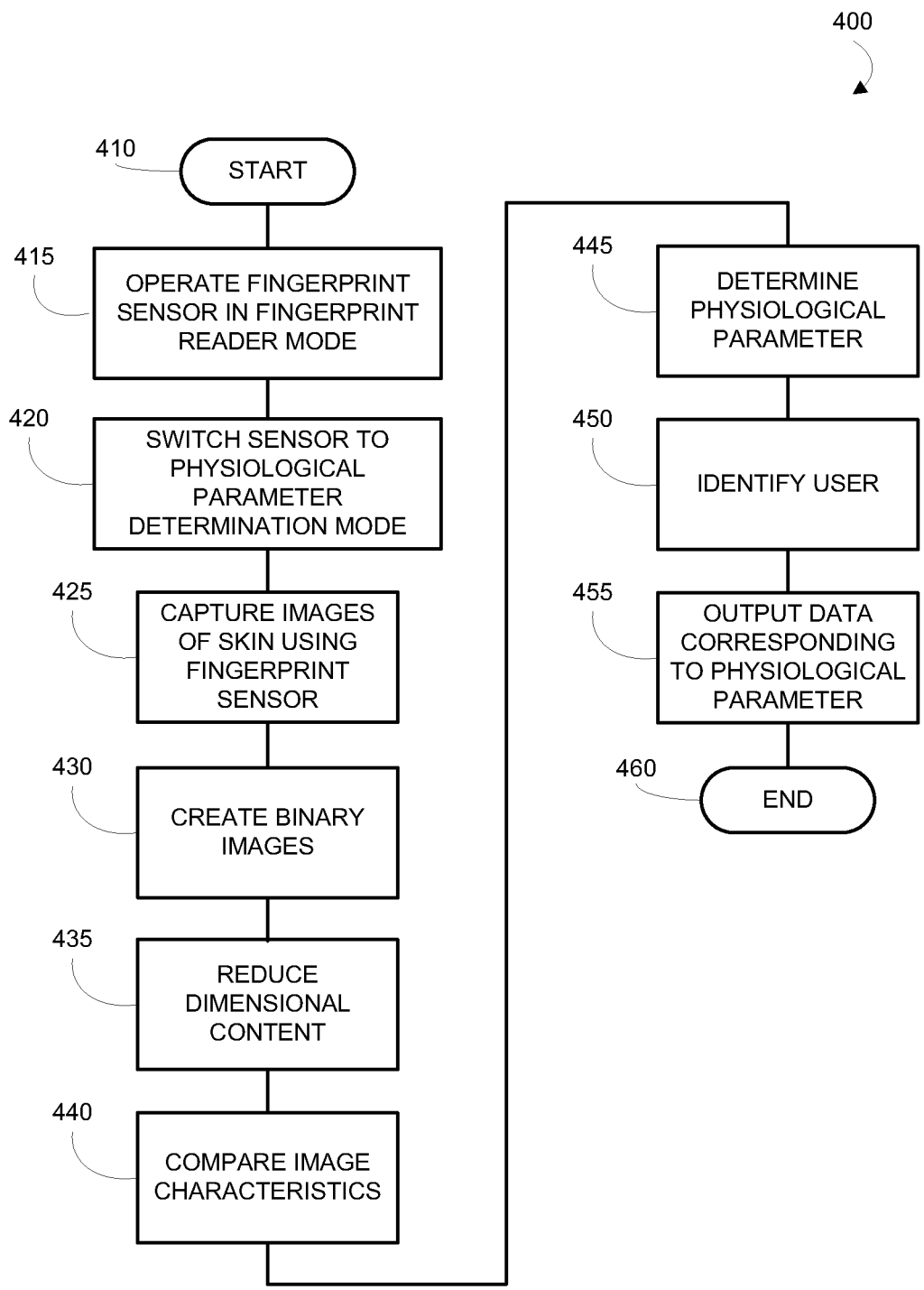
FIG. 4 is an exemplary flowchart illustrating the operation of an apparatus in accordance with a possible embodiment.

FIG. 4 is an exemplary flowchart 400 illustrating the operation of an apparatus, such as the apparatus 200, according to a possible embodiment. The flowchart 400 can incorporate features of corresponding elements from the flowchart 300. At 410, the flowchart begins. At 415, a fingerprint sensor is operated in a fingerprint reader mode by capturing a live scan of a fingerprint pattern from a finger on a touch surface to authenticate a user of a portable electronic device. For example, the fingerprint reader mode can scan one image of a fingerprint pattern, such as by capturing a live scan of the fingerprint pattern from a finger swipe across the touch surface. The fingerprint sensor can operate in a fingerprint reader mode by operating the fingerprint sensor at a first focal point at substantially the surface of skin on the touch surface to authenticate a user of the portable electronic device. The fingerprint sensor can also operate in a fingerprint reader mode by operating the fingerprint sensor at a first exposure time to authenticate a user of the portable electronic device. The fingerprint sensor can further operate in a fingerprint reader mode by operating the fingerprint sensor at a first number of frames per second to authenticate a user of the portable electronic device.

At 420, fingerprint sensor parameters can be changed to switch the fingerprint sensor from the fingerprint reader mode to a physiological parameter determination mode. The physiological parameter determination mode can constantly or continually capture a plurality of images, such as multiple images and/or a video sequence, of a finger pressed in a substantially constant position against the fingerprint sensor. The changed fingerprint sensor parameters can include white balance, exposure time, frame rate, focal point, and other fingerprint sensor parameters that can be changed to allow a fingerprint sensor to determine one or more physiological parameters. For example, the fingerprint sensor can operate in the physiological parameter determination mode by operating the fingerprint sensor at a second focal point different from the fingerprint reader mode first focal point. The second focal point can correspond to an area at a distance beneath the surface of skin to operate the fingerprint sensor as a physiological parameter monitor. The area at a distance beneath the surface of the skin can include one or more capillaries. The fingerprint sensor can also operate in the physiological parameter determination mode by increasing the exposure time from the fingerprint reader mode first exposure time to a second exposure time to operate the fingerprint sensor as a physiological parameter monitor. The fingerprint sensor can also operate in the physiological parameter determination mode by increasing the number of frames per second from the fingerprint reader mode first number of frames per second to a second number of frames per second to operate the fingerprint sensor as a physiological parameter monitor.

At 425, a plurality of images corresponding to an area beneath a surface of skin can be captured using the fingerprint sensor. FIG. 5 illustrates an example of a visible light image 501 that can be captured using a fingerprint sensor on a portable electronic device. Blood pumped by the heart of a user can cause levels of light in the visible light image 501 to change, which can be used to determine a physiological parameter.

Figure 6:
FIG. 6 is an illustrative example of a resultant binary image in accordance with a possible embodiment.

At 430, a plurality of binary images can be created based on the plurality of captured images. The plurality of binary images can contain information corresponding to pixels exceeding a threshold. For example, the threshold can be used to convert individual sub-images into corresponding binary images. The plurality of binary images can be created by processing the plurality of captured images, can be created from decomposed sub-images, can be created from a plurality of captured and decomposed images, or can otherwise be based on the plurality of captured images. As a further example, the plurality of binary images can be created by extracting raw Bayer images based on the plurality of captured images. FIG. 6 illustrates an example of one of the plurality of binary images 601.

Figure 7:
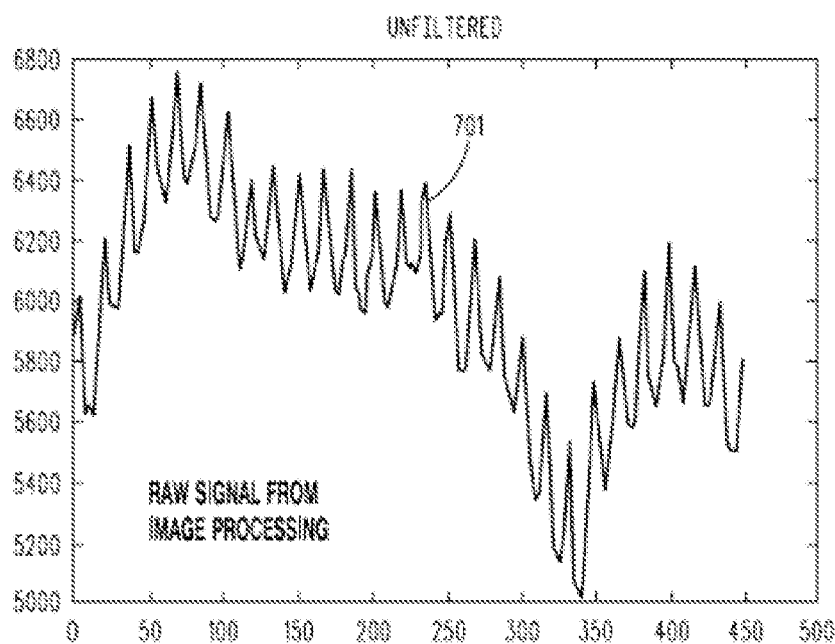
FIG. 7 is a reduced dimensionality graphic representation corresponding to the resultant binary image in accordance with a possible embodiment.

At 435, dimensional content of the plurality of binary images can be reduced to generate reduced dimension information. Reducing the dimensional content of the plurality of binary images can include summing a number of pixels exceeding the threshold for each image of the plurality of binary images to generate reduced dimension information for each image. The dimensionality reduction can be due to summing of binarized pixel values for each of the sub-images, hence giving the area. FIG. 7 illustrates an example reduced dimensionality graphic representation 701 corresponding to images, such as the binary image 601. The graphic representation 701 can illustrate the summed area or number of pixels that exceed the threshold value vs. time or number of frames.

Peaks and valleys in the graphic representation 701 may coincide with changes in blood flow in capillaries, which can correspond to the physiological parameter, such as a heartbeat.

Figure 8:
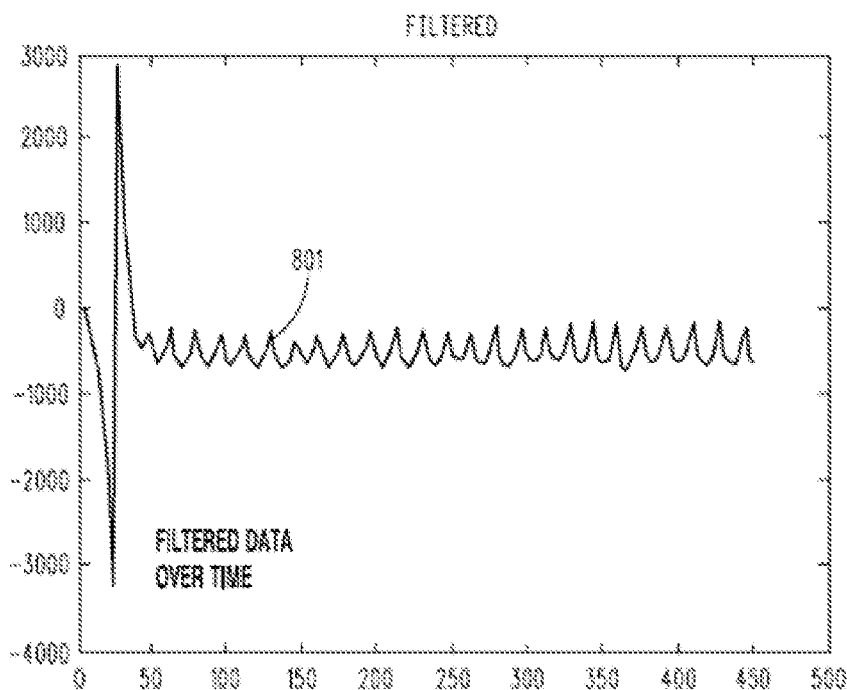
FIG. 8 is a filtered reduced dimensionality graphic representation corresponding to the resultant binary image in accordance with a possible embodiment.

At 440, image characteristics corresponding to at least a first image of the plurality of images can be compared with image characteristics corresponding to at least a second image of the plurality of images. Image characteristics can be compared by comparing image characteristics corresponding to at least a first binary image with image characteristics corresponding to at least a second binary image. Image characteristics can also be compared by comparing image characteristics corresponding to the reduced dimension information based on at least the first binary image with image characteristics corresponding the reduced dimension information based on at least the second binary image. Low frequencies of the reduced dimension information can be filtered out prior to comparing the image characteristics. FIG. 8 illustrates an example filtered reduced dimensionality graphic representation 801 corresponding to images, such as the binary image 601. For example, peaks and valleys in the graphic representation 801 may coincide with changes in blood flow in capillaries, which can correspond to the physiological parameter, such as a heartbeat. Image comparison analysis can be performed in the time domain or in the frequency domain.

At 445, a physiological parameter can be determined based on comparing the image characteristics. The physiological parameter can be a blood related physiological parameter, such as heart rate, oxygen consumption, maximal oxygen consumption, blood oxygenation, or can be any other physiological parameter. At 450, a user of the portable communication device can be identified based on information corresponding to the image characteristics. For example, characteristics corresponding to the physiological parameter can be used as a primary form of authentication or as a secondary form of authentication along with a fingerprint pattern. Some level of authentication can be extracted from a signal used to extract the physiological parameter to provide a primary or secondary form of identification.

At 455, data corresponding to the physiological parameter can be output. The data can be output by displaying the physiological parameter on a display on the portable electronic device. Multiple physiological parameters can be displayed on the display. The data can also be output by storing data corresponding to the physiological parameter. The data can also be output by wirelessly transmitting data corresponding to the physiological parameter across a cellular communications network to a server. For example, the portable electronic device can store the data on the portable electronic device and/or can store it at a server. At 460, the flowchart can end.

The methods of this disclosure are preferably implemented on a programmed processor. However, the operations of the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the operations of the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method comprising:
    capturing a plurality of images corresponding to an area beneath a surface of skin using a fingerprint sensor configured to capture a live scan of a fingerprint pattern from a finger on a touch surface on a portable electronic device;
    comparing image characteristics corresponding to at least a first image of the plurality of images with image characteristics corresponding to at least a second image of the plurality of images; and
    determining a physiological parameter based on comparing the image characteristics,
    wherein the method further comprises:
        operating the fingerprint sensor in a fingerprint reader mode including capturing a live scan of a fingerprint pattern from a finger on the touch surface to authenticate a user of the portable electronic device;
        operating the fingerprint sensor at a first number of frames per second to authenticate a user of the portable electronic device;
        changing fingerprint sensor parameters to switch the fingerprint sensor from the fingerprint reader mode to a physiological parameter determination mode; and
        increasing the first number of frames per second to a second number of frames per second to operate the fingerprint sensor as a physiological parameter monitor, and
    wherein the physiological parameter comprises a heart rate or oxygen consumption.

2. The method according to claim 1, further comprising:
    operating the fingerprint sensor at a first focal point at substantially the surface of skin on the touch surface to authenticate a user of the portable electronic device; and operating the fingerprint sensor at a second focal point corresponding to an area at a distance beneath the surface of skin to operate the fingerprint sensor as a physiological parameter monitor.

3. The method according to claim 2, wherein the area at a distance beneath the surface of the skin includes one or more capillaries.

4. The method according to claim 1, further comprising:
operating the fingerprint sensor at a first exposure time to authenticate a user of the portable electronic device; and
increasing the exposure time to a second exposure time to operate the fingerprint sensor as a physiological parameter monitor.

5. The method according to claim 1, wherein comparing image characteristics comprises comparing differences between image characteristics corresponding to at least the first image of the plurality of images and image characteristics corresponding to at least the second image of the plurality of images.

6. The method according to claim 1, further comprising identifying a user of the portable communication device based on information corresponding to the image characteristics.

7. The method according to claim 1,
wherein comparing image characteristics comprises comparing image characteristics corresponding to a first intensity of at least the first image with image characteristics corresponding to a second intensity of at least the second image, and
wherein a difference between the first intensity and the second intensity correspond to changes in density of blood flow.

8. The method according to claim 1, further comprising creating a plurality of binary images based on the plurality of captured images, where the plurality of binary images contain information corresponding to pixels exceeding a threshold,
wherein comparing image characteristics comprises comparing image characteristics corresponding to at least a first binary image with image characteristics corresponding to at least a second binary image.

9. The method according to claim 8, wherein creating a plurality of binary images includes extracting raw Bayer images based on the plurality of captured images.

10. The method according to claim 8, further comprising reducing dimensional content of the plurality of binary images to generate reduced dimension information,
wherein comparing image characteristics comprises comparing image characteristics corresponding to the reduced dimension information based on at least the first binary image with image characteristics corresponding the reduced dimension information based on at least the second binary image.

11. The method according to claim 10, wherein reducing the dimensional content of the plurality of binary images comprises summing a number of pixels exceeding the threshold for each image of the plurality of binary images to generate reduced dimension information for each image.

12. The method according to claim 1, further comprising displaying the physiological parameter on a display on the portable electronic device.

13. The method according to claim 1, further comprising storing data corresponding to the physiological parameter.

14. The method according to claim 1, further comprising wirelessly transmitting data corresponding to the physiological parameter across a cellular communications network to a server.

15. An apparatus comprising:
a portable electronic device housing;
a fingerprint sensor coupled to the portable electronic device housing, the fingerprint sensor configured to capture a live scan of a fingerprint pattern from a finger on a touch surface; and
a controller coupled to the portable electronic device housing and coupled to the fingerprint sensor, the controller including:
an image capture module configured to capture a plurality of images corresponding to an area beneath a surface of skin using the fingerprint sensor;
an image comparison module configured to compare image characteristics corresponding to at least a first image of the plurality of images with image characteristics corresponding to at least a second image of the plurality of images; and
a physiological parameter determination module configured to determine a physiological parameter based on comparing the image characteristics,
wherein the controller is configured to operate the fingerprint sensor in a fingerprint reader mode including capturing a live scan of a fingerprint pattern from a finger on the touch surface to authenticate a user of the apparatus and configured to change fingerprint sensor parameters to switch the fingerprint sensor from the fingerprint reader mode to a physiological parameter determination mode,
wherein the controller is configured to operate the fingerprint sensor at a first number of frames per second to authenticate a user of the apparatus,
wherein the controller is configured to increase the number of frames per second to a second number of frames per second to operate the fingerprint sensor as a physiological parameter monitor, and
wherein the physiological parameter comprises a heart rate or oxygen consumption.

16. The apparatus according to claim 15, further comprising a transceiver coupled to the portable electronic device housing and coupled to the controller, the transceiver configured to wirelessly transmit and receive data across a wireless wide area network.

17. A method comprising:
operating a fingerprint sensor in a fingerprint reader mode including capturing a live scan of a fingerprint pattern from a finger on a touch surface to authenticate a user of a portable electronic device;
changing fingerprint sensor parameters to switch the fingerprint sensor from the fingerprint reader mode to a heart rate determination mode;
capturing a plurality of images corresponding to an area beneath a surface of skin using the fingerprint sensor;
comparing image characteristics corresponding to at least a first image of the plurality of images with image characteristics corresponding to at least a second image of the plurality of images;
determining a heart rate based on comparing the image characteristics; and
outputting data corresponding to the heart rate,
wherein the method further comprises:
operating the fingerprint sensor at a first number of frames per second to authenticate a user of the portable electronic device in the fingerprint reader mode; and
increasing the number of frames per second to a second number of frames per second to operate the fingerprint sensor in the heart rate determination mode.

18. The method according to claim 1, wherein the physiological parameter comprises a blood related physiological health parameter.

19. The method according to claim 18, wherein a blood related physiological health parameter further comprises one of a maximal oxygen consumption and blood oxygenation.

* * * * *